US007707517B2

United States Patent
Bier et al.

(10) Patent No.: US 7,707,517 B2
(45) Date of Patent: Apr. 27, 2010

(54) SYSTEMS AND METHODS FOR DISPLAYING META-DATA

(75) Inventors: Eric Allan Bier, Palo Alto, CA (US); Stephen W. Smoliar, Palo Alto, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 960 days.

(21) Appl. No.: 11/300,559

(22) Filed: Dec. 14, 2005

(65) Prior Publication Data
US 2006/0277496 A1 Dec. 7, 2006

Related U.S. Application Data

(60) Provisional application No. 60/686,210, filed on Jun. 1, 2005.

(51) Int. Cl.
*G06F 3/048* (2006.01)
(52) U.S. Cl. ..................... 715/835; 715/700; 715/840; 715/846
(58) Field of Classification Search ................ 715/700, 715/835–840, 846–847
See application file for complete search history.

(56) References Cited

U.S. PATENT DOCUMENTS

| | | | |
|---|---|---|---|
| 5,838,317 A | | 11/1998 | Bolnick et al. |
| 6,043,817 A * | | 3/2000 | Bolnick et al. .............. 715/788 |
| 6,883,143 B2 * | | 4/2005 | Driskell ..................... 715/763 |
| 6,990,637 B2 * | | 1/2006 | Anthony et al. ............. 715/851 |
| 7,478,340 B2 * | | 1/2009 | Parikh et al. ................ 715/788 |
| 2003/0112280 A1 * | | 6/2003 | Driskell ..................... 345/835 |
| 2003/0222921 A1 * | | 12/2003 | Rummel ..................... 345/788 |
| 2004/0165010 A1 | | 8/2004 | Robertson et al. |
| 2005/0144251 A1 * | | 6/2005 | Slate ......................... 709/215 |
| 2005/0187943 A1 * | | 8/2005 | Finke-Anlauff et al. ..... 707/100 |

OTHER PUBLICATIONS

B. Bederson, B. Shneiderman, Martin Wattenberg, "Ordered and quantum treemaps making effective use of 2d space to display hierarchies" ACM Transactions on Graphics vol. 21 No. 4 Oct. 2002 pp. 833-854.

B. Bederson, A. Boltman, "Does Animation Help Users Build Mental Maps of Spatial Information?", Proceedings of IEEE InfoVis '99,. 1999, pp. 28-35.

(Continued)

*Primary Examiner*—Simon Ke
(74) *Attorney, Agent, or Firm*—Patrick J. S. Inouye; Scott E. Smith

(57) ABSTRACT

Techniques are presented to display values for a set of icons by controlling their assignment to a set of rows and their placement within these rows. A plurality of icons to be displayed is determined. An abacus attribute taking a finite set of values is associated with the set of icons. Icon groups are formed for each abacus attribute value and optionally ordered based on each of one or more sorting attributes. Inter-group indicators such as display characteristic changes, spacing and the like are determined. The inter-group indicators separate each group of icons within a row. An ordering of the icons is determined based on the abacus attribute value and the one or more optional sorting attribute values. The icons are laid out in the display space ordered by the values of the primary abacus attribute and the secondary optional sorting attributes.

17 Claims, 14 Drawing Sheets

OTHER PUBLICATIONS

E. Bier, L. Good, K. Popat, "A document corpus browser for in-depth reading" Proceedings of the Joint Conference on Digital Libraries 2004, pp. 87-96.

J. MacKinlay, "Automating the design of graphical presentations of relational information", ACM Transactions on Graphics, vol. 5, Issue 2, (Apr. 1986) pp. 110-141.

L. Nowell, R. France, D. Hix, L. Heath, E. Fox, "Visualizing Search Results: Some Alternatives to Query Document Similarity", Proceedings of SIGIR '96, 1996, pp. 67-75.

G. Robertson, M. Czerwinski, K. Larson, D. Robbins, D. Thiel, M. Van Dantzich, "Data Mountain: Using Spatial Memory for Document Management" Proceedings of ACM UIST '98. 1998 pp. 153-162.

B. Shneiderman, D. Feldman, A. Rose, X. Grau, Visualizing Digital Library Search Results, with Categorical and Hierarchical Axes. Proceedings of the 5th ACM Conference on Digital Libraries. 2000. pp. 57-66.

\* cited by examiner

SYSTEMS AND METHODS FOR DISPLAYING META-DATA

This application claims the benefit of Provisional Patent Application No. 60/686,210 filed Jun. 1, 2005, the disclosure of which is incorporated herein by reference, in its entirety.

This invention was made with U.S. government support under ARDA NIMD Contract No. #MDA904-03-C-0404. The U.S. government may have certain rights in the invention.

BACKGROUND OF THE INVENTION

1. Field of Invention

This invention relates to visualizing information.

2. Description of Related Art

Conventional graphical user interface and information visualization systems display data records using a two dimensional display space. Various attributes of the records are then presented by varying the size, shape, color, position and other display features of icons representing the records. The position display feature is useful since it is perceived even by color blind users and makes direct use of spatial memory. Conventional visualization systems display records in grids that allow the user to easily find the relevant information. However, these conventional visualization designs result in significant wasted space.

SUMMARY OF THE INVENTION

Thus, systems and methods that display meta-data in a compact positional form would be useful. The systems and methods according to this invention display values for a set of icons based on abacus attribute values. A plurality of icons to be displayed is determined. An abacus attribute taking a finite set of values is associated with the set of icons. Icon groups are formed for each abacus attribute value and optionally ordered based on one or more sorting attributes. Inter-group indicators such as display characteristic changes, spacing and the like are determined. The inter-group indicators separate each group of icons within a row. This process is repeated on all rows individually, so that each row makes efficient use of available space. An ordering of the icons is determined based on the abacus attribute value and the one or more optional sorting attribute values. The icons are assigned to rows based on the optional sorting attributes and grouped within rows based on the abacus attribute.

DETAILED DESCRIPTION OF EXEMPLARY EMBODIMENTS

Figure 1:
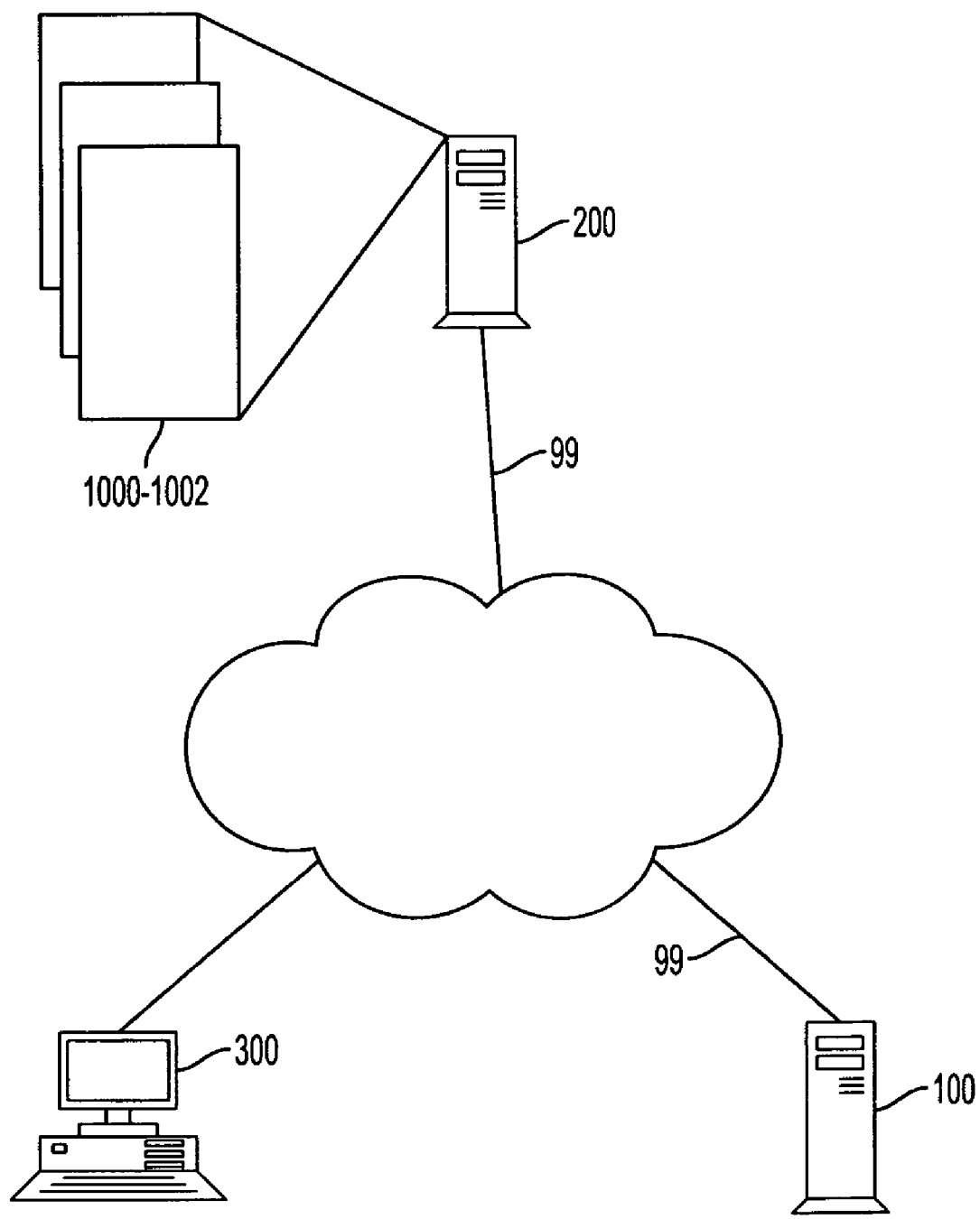
FIG. 1 shows an exemplary overview of a system for displaying meta-data according to this invention.

FIG. 1 shows an exemplary overview of a system for displaying meta-data according to this invention. The system for displaying meta-data 100 is connected via communications links 99 to an information repository 200 providing access to documents 1000-1002 and to a communications enabled personal computer 300.

In one exemplary embodiment, a user of the communications-enabled personal computer 300 initiates a request for a visualization of documents in the collection 1000-1002, based on an attribute with a finite set of values, such as a read/unread binary attribute. The visualization request is forwarded over the communications links 99 to the system for displaying meta-data 100. The system for displaying meta-data 100 acts as a proxy to retrieve the documents 1000-1002 over the communications links 99. Information about the documents read by the user is retrieved from the records management component (not shown) of the information repository 200, directly from the user and the like.

The system for displaying meta-data 100 optionally assigns icons to rows in the visualization based on a second attribute. For example, in an exemplary reading environment according to this invention, a sequence of rows of the visualization may represent the date the document was published. However, it should be apparent that any known or later developed attribute may be used to optionally categorize the collection into rows.

Before the icons are assigned to rows, the maximum number of icons per row is determined. The maximum number of icons may be selected by the user and/or determined under program control. After the icons are assigned to rows, the icons are assigned to groups based on the read/unread attribute value. Thus, a first group of icons is determined based on the read attribute value. The first group of icons represents documents that have been read by the user. A second group of icons is determined based on the unread attribute value. The second group of icons represents documents unread by the user.

Each row of icons is laid out in a display space wide enough for the previously determined maximum number of icons per row plus an inter-group indicator for each value of the chosen attribute less one. The inter-group indicator includes, but is not limited to a quantity of space that forms a gap between adjacent columns of icons in each row; a change of display attribute between adjacent icons, background changes, font changes and/or any other known or later developed display characteristic useful in indicating a logical separation between adjacent icons. In contrast with conventional grid displays, the icons associated with a particular attribute value are not constrained to lie within straight columns with unvarying left and right edges, but instead are organized into columns computed individually for each row of icons. The left and right edges of these columns may vary from row to row, creating variably contoured group boundaries. The variable dimensions of the columns of icons sharing the same attribute value depend on the number of icons in each group on each row. The left edge of each group of icons on each row depends on the number of icons in all of the icon groups to the left of that group and on the size of any inter-group gaps to the left of that group.

The first group of icons is placed in a first portion of the display space of the visualization. The second group of icons is placed in a second portion of the display space. In this case, icons to the left of the inter-group indicator are easily identified as representing documents that have been read by the user. The icons located on the right hand side of the inter-group indicator are easily identified as representing un-read documents. Moreover, it will be apparent that non-binary attributes values may be represented by forming additional columns for each group with an inter-group indicator separating each successive group.

After the user's read/un-read documents have been displayed, the system for displaying meta-data 100 forwards the visualization to the user over the communications links 99.

Figure 2A:
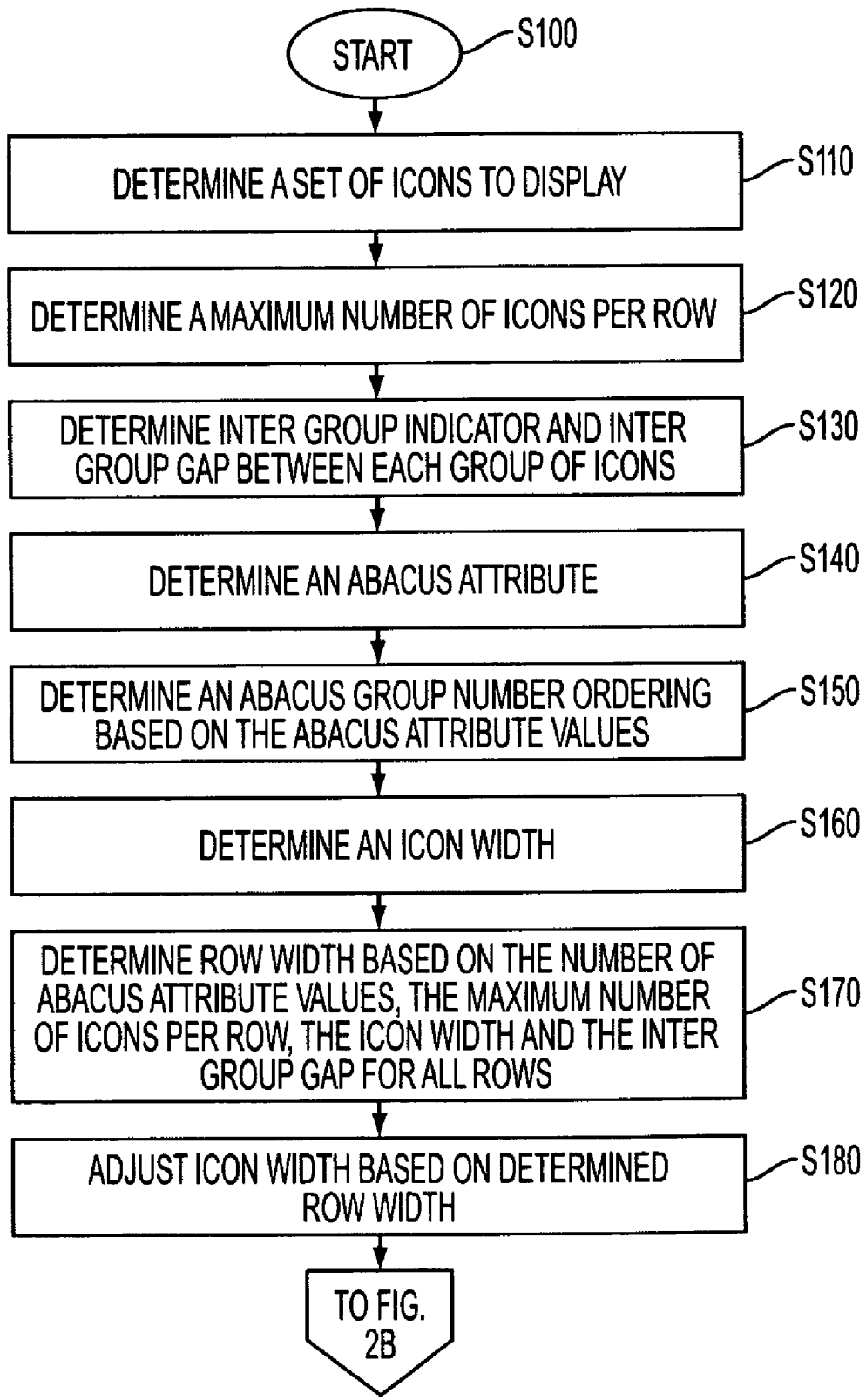
FIG. 2 is an exemplary flowchart of a method for displaying information according to this invention.
Figure 2B:
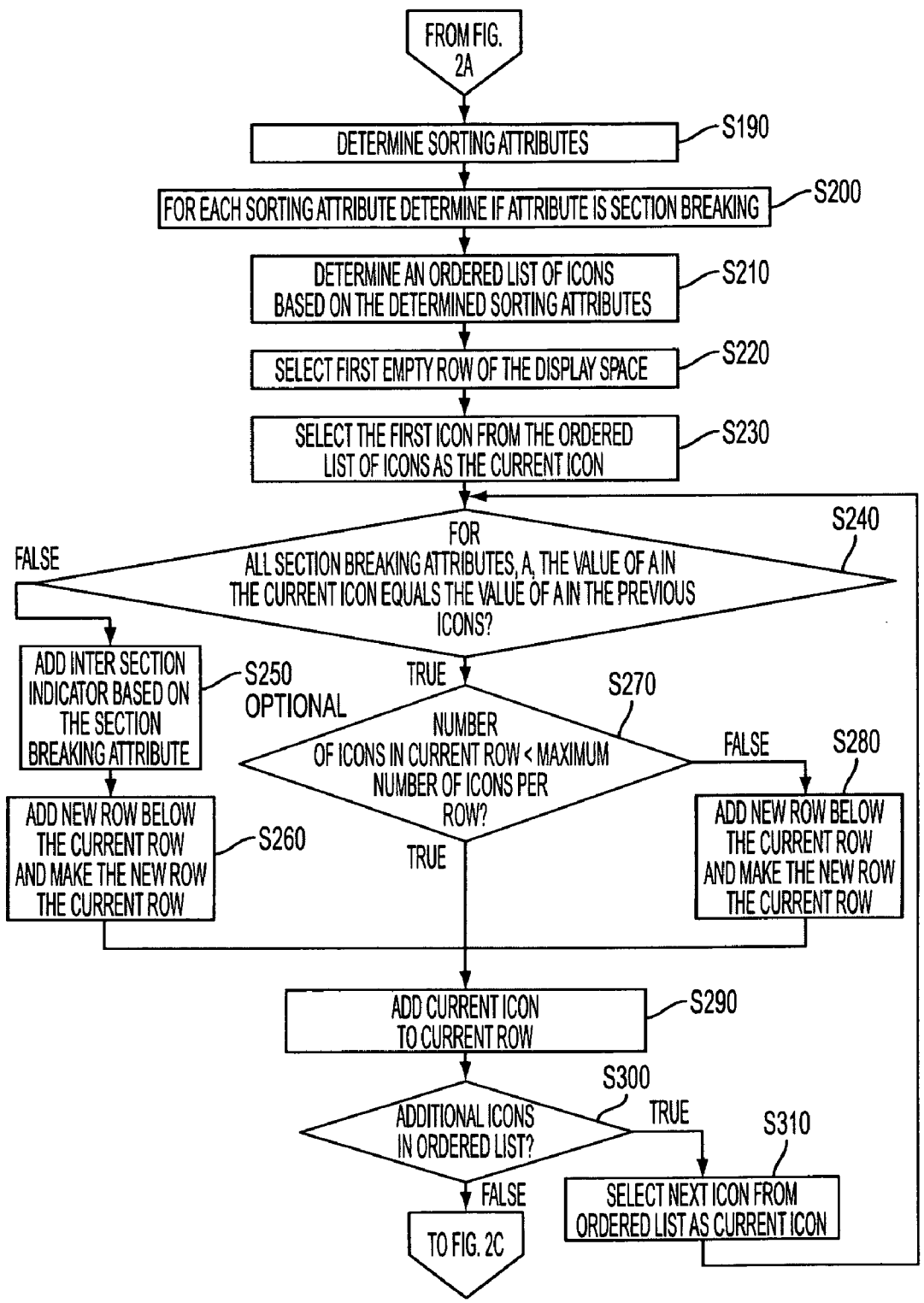
Figure 2C:
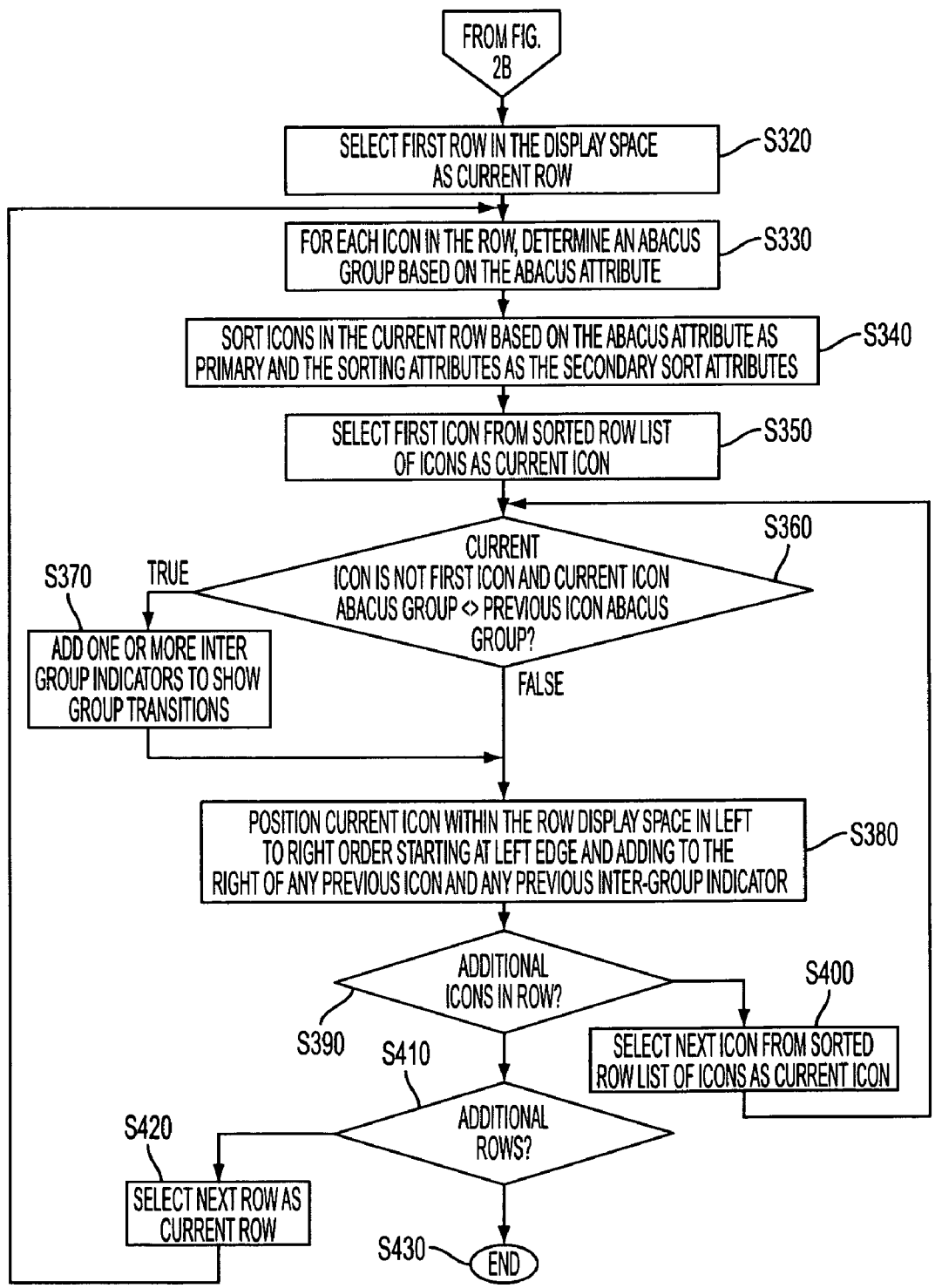

FIG. 2 is an exemplary flowchart of a method for displaying information according to this invention. The process begins at step S100 and immediately continues to step S110.

In step S110, a set of icons to be displayed is determined. The icons represent documents, records, contacts and/or any other type of information to be visualized. In one exemplary embodiment, the set of icons is determined during an interactive session and represents documents to be visualized with respect to a particular value of interest to the user. After the set of icons has been determined, control continues to step S120.

The maximum number of icons in each row is determined in step S120. After the maximum number of icons for each row has been determined, control continues to step S130 where an inter-group gap or indicator to be displayed between the groups is determined. The inter-group gap or indicator may be a specific indicator such as a space, a change in appearance such as a difference between display characteristics, a jagged or other line separating groups, differing background between groups and/or any indicator useful in indicating a logical difference between groups. After the inter-group indicator has been determined, control continues to step S140.

In step S140, the abacus attribute is determined. The abacus attribute is the attribute for which items in the collection are to be compared. The abacus attribute is used to partition the items in the collection into abacus groups. For example if the abacus attribute is a binary true/false valued attribute, then two abacus groups are created. An exemplary first group is associated with icons for which the abacus attribute is true and an exemplary second group is associated with icons for which the abacus attribute value is false.

In various other exemplary embodiments according to this invention, abacus groups are created for each value or set of values associated with the abacus attributes. Numeric abacus attribute values may be binned. That is, numeric attribute values within a defined range are assigned to a common abacus group number. It will be apparent that abacus attributes may be of any data type that takes a finite number of values or a data type that takes an infinite number of values, as long as only a finite number of them are used by the icons to be displayed. After the abacus attribute has been determined, control continues to step S150.

An abacus group number ordering is determined based on the abacus attribute values in step S150. The abacus group number ordering specifies the position of values in the display space. For example, for a binary true/false valued abacus attribute two abacus attribute groups are created. In one exemplary ordering according to this invention, the true valued group is given a smaller number and is placed on the left of the inter-group indicator and the false valued group is given the next larger number and is placed on the right. However, it should be apparent that in still other exemplary embodiments according to this invention, the ordering is set by the user, determined under programmatic control or the like. After the abacus group has been determined, control continues to step S160.

In step S160, an icon width is determined. The icon width is also selectable by the user or set under program control. After the icon width has been determined, control continues to step S170 where the row widths are determined based on the number of abacus attributes, the maximum number of icons per row, the icon width and the inter-group indicator or inter-group gap for all rows.

That is, a greater number of abacus attribute values associated with non-zero width group indicators consume display space within the row. A wider icon width results in a wider row. A larger value for the maximum number of icons per row results in a wider row. Each of these values may be selected by the user, set programmatically or the like. After the row width has been determined, control continues to step S180.

In step S180, the icon width is optionally adjusted based on the determined row width. Thus, a scaling may be used to further adjust the row width. After the icon width has been optionally adjusted, control continues to step S190 where the sorting attributes are determined.

Exemplary sorting attributes in a reading environment may include, but are not limited to, year of publication, author, publication name, personal rating, title, date the document was added to the collection, and/or any other known or later developed attribute value. The sorting attributes are used to organize the icons into a pattern or ordering recognizable to the user. After the sorting attributes have been determined, control continues to step S200.

In step S200, a determination is made as to which sorting attributes are section-breaking and which are not section-breaking. A section breaking attribute is an attribute that segregates icons into different sections of the display. It will be apparent that the section breaking feature of an attribute may be set by the user, determined programmatically or the like. For example, in an exemplary reading environment, a publication year attribute is determined to be a section-breaking attribute that segregates the icons into vertical portions of the display. The non-section breaking sorting attributes organize the icons within each vertical section. Thus, in one exemplary reading environment, a non-section breaking sorting attribute associated with the author name is used to alphabetically sort the icons by author name. After the section breaking attributes have been determined, control continues to step S210.

An ordered list of icons is determined based on the determined sorting attributes in step S210. In various exemplary embodiments according to this invention, the sorting attributes reflect publication dates, author names, document titles, journal titles and/or other attributes useful in identifying patterns in the underlying information. The ordered list may be stored in a linked list, an array, and/or any other known or later developed data structure useful in storing the ordered icons. After the ordered list of icons has been has been determined, control continues to step S220.

In step S220, the first empty row of the display space is selected. The first empty row reflects the area in the current display space into which icons are to be added. After the first empty row in the display space is determined, control continues to step S230 where the first icon from the ordered list of icons is selected as the current icon. Control then continues to step S240.

A determination is made as to whether the value of any section breaking attributes associated with the current icon differ from the section breaking attributes associated with the previous icon in step S240. The section breaking attributes are used to determine whether or not two icons that are adjacent in the ordered list may be placed together on the same row, or must be forced to be on separate rows so that the change in value of section-breaking attribute will be readily apparent to the user. Thus, in an exemplary reading environment, the year of publication is a section breaking attribute used to vertically segregate the icons into blocks of consecutive rows. If one or more section breaking attributes are determined to differ, control continues to step S250.

In step S250, the inter-section indicator is determined based on the section breaking attribute. The inter-section indicator may include, but is not limited to a label indicating the common attribute value of the icons within the section. After the inter-section indicator has been determined, control then continues to step S260 where a new row is added to the display space below the current row. The new row is made the current row and control continues to step S290.

However, if the section breaking attributes of the current icon do not differ from the section breaking attributes of the previous icon in step S240, then control continues to step S270. A determination is made as to whether the number of icons in the current row are less than the maximum number of icons of icons per row in step S270. If the number of icons exceeds or equals the maximum number of icons allowed in a row, control continues to step S280 where a new row is added below the current row and control continues to step S290.

In step S290, the current icon is added to the current row and the order in which it was added, relative to other icons in the row, is recorded. In various other exemplary embodiments, it need not be given a spatial position by this step; but will receive a spatial position in later steps. After adding the current icon to the current row, control continues to step S300 where a determination is made as to whether there are additional icons in the ordered list.

If there are additional items in the sorted list, control continues to step S310 and the next icon is selected as the current icon. Control then immediately jumps to step S240. Steps S240-S310 repeat until no additional icons remain in the ordered list. When it is determined that no further icons remain, control continues to step S320.

In step S320, the first row in the display space is selected as the current row. After the first row has been selected, control continues to step S330.

In step S330, an abacus group is determined for each icon in the current row based on the abacus attribute. Each abacus group is associated with one of the abacus attribute values. Thus, an exemplary binary abacus attribute is associated with two abacus groups, namely a first abacus group associated with the true value and a second abacus group associated with the false value. Numeric abacus attributes are associated with multiple abacus groups. Various exemplary embodiments implement optional binning of the abacus attribute values to group similar attribute values. After the abacus groups have been determined, control continues to step S340.

The icons in the current row are sorted using the abacus attribute as the primary or more significant attribute and the sorting attributes as the secondary or less significant attributes in step S340. For example, in one embodiment, a user orders the binary true abacus attribute values to appear before the binary false attribute values. For numeric values, lower numbers are ordered to appear to the left of larger numbers, or to the right of larger numbers, depending on the attribute, and on user or designer preferences.

Once the icons have been sorted into icon abacus groups by the abacus attribute, the sort attributes are used to sort the icons within the groups. Thus, author name, publication name, publication year, and/or other criteria are used to further order the icons within the groups. After the icons have been sorted, control continues to step S350 where the first icon in the sorted list is selected as current icon. Control then continues to step S360.

In step S360, a determination is made as to whether the current icon is not the first icon in the current row and the current icon's abacus group number is not the same as the previous icon abacus group. If so, control continues to step S370 where one or more inter-group indicators are added to show group transitions. Otherwise, if it is determined that the current icon is the first icon in the current row, or the current abacus group equals the previous abacus group, control continues to step S380.

The current icon is added within the row display space in step S380. In various exemplary embodiments, the icons are added in a left to right order starting at the left edge and adding icons to the right of previous icons and previous inter-group indicators. However, right to left, top to bottom (within vertical columns instead of horizontal rows) and/or other insertion strategies may also be used without departing from the scope of this invention. Also, the group that corresponds to the final abacus attribute value may optionally be right-justified, if desired, to create a tidy appearance (or left-, top- or bottom-justified in the case that icons are formatted in a right-to-left, bottom-to-top, or top-to-bottom manner respectively). In this case, the icons of that group are moved to align with the pre-determined right edge of the row. After the current icon has been added to the row, control continues to step S390.

In step S390, a determination is made as to whether there are additional icons to be displayed in the row. If it is determined that there are additional icons to be displayed in the row, control continues to step S400 where the next icon in the sorted list of icons is selected as the current icon. Control then jumps to step S360. Steps S360-S400 are repeated until it is determined in step S390 that there are no additional icons to be displayed in the row. Control then continues to step S410.

A determination is made as to whether there are additional rows to be displayed in step S410. If it is determined that there are additional rows, control continues to step S420 where the next row is selected as the current row. Control then jumps to step S330. Steps S330-S420 are repeated until it is determined in step S410 that no additional rows remain to be displayed. Control then continues to step S430 and the process ends.

Figure 3:
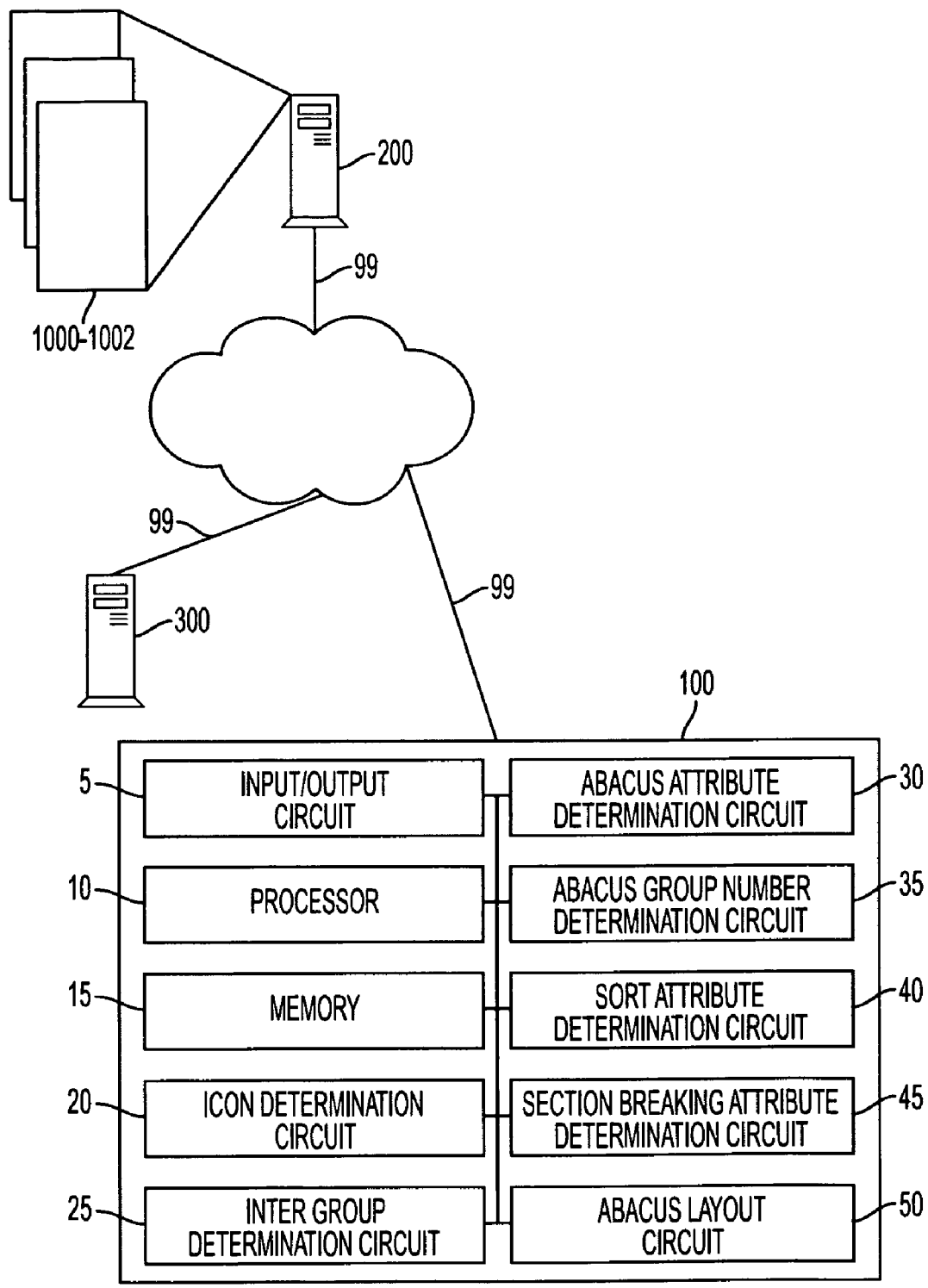
FIG. 3 is an exemplary system for displaying meta-data according to this invention.

FIG. 3 is an exemplary system for displaying meta-data according to this invention. The system for displaying meta-data 100 is connected to an information repository 200 providing access to documents 1000-1002 and to a communications enabled personal computer 300 via communications links 99.

In one exemplary embodiment, a user of the communications-enabled personal computer 300 initiates a request for a visualization of documents in the collection 1000-1002, based on the read/unread binary attribute. The request is forwarded over the communications links 99 to the system for displaying meta-data 100. The processor 20 of the system for displaying meta-data 100 activates the input/output circuit 10 to retrieve the documents 1000-1002 via the communications links 99.

The processor 20 activates the abacus attribute determination circuit 30 to determine an attribute of documents in the collection and all values of that attribute. The abacus attribute is the attribute used to group icons in the display space. Each value of the abacus attribute is generally associated with a group. Thus, for binary attributes, first and second abacus groups are formed. For numeric abacus attributes, larger numbers of single member groups are optionally combined or binned into a smaller number of groups based on the range of abacus attribute values. It will be apparent however that any type of abacus attribute having a finite set of values may be used in the practice of this invention. For example, the attribute may be the binary read/unread attribute, a rating (such as quality on a scale of 1 to 5), a measure of how recently the document was added to the collection, or any other attribute. Information about the documents read by the user is retrieved from a records management component (not shown) of the information repository 200, directly from the user and/or determined from any other source of information about user reading habits or the like.

The processor 20 determines icons representing the documents in the collection by activating the icon determination circuit 20. The inter-group determination circuit 25 is activated to determine the type of inter-group indicator to be used. In various exemplary embodiments, the inter-group indicator is an inter-group gap induced between groups of icons to visually signal the logical differences between the groups. However, a jagged or straight line, a difference between group specific backgrounds, differing display characteristics and/or any other known or later developed method of signaling a boundary between groups may also be used, alone or in combination, in the practice of this invention.

The processor 10 then activates the abacus group number determination circuit 35 to assign each icon an abacus group number. Each abacus group number is associated with an abacus group. That is, icons are assigned to abacus groups by associating the icon with a group number.

The processor 10 then activates the sort attribute determination circuit 40 to determine sort attributes for the icons. The sort attributes determine an initial ordering on all of the icons that determines which icons will be assigned to each row and which sections will contain which rows. The sort attributes are additionally used, once icons have been placed in abacus groups, to determine how the icons will be ordered within each group. In an exemplary reading embodiment according to this invention, author name and publication year are selected as sort attributes. The sort attributes may be selected by the user and/or determined programmatically without departing from the scope of the invention.

The processor 10 then activates the section breaking attribute determination circuit 45 to determine attributes that further segregate the icons within the display space. The section breaking attributes may be selected by the user, retrieved from a previously entered preference file, determined programmatically or the like. For example, in an exemplary reading environment, the publication year attribute is selected as a section breaking attribute. The icons are grouped into vertical sections based on the publication year attributes. Within each section, the icons are placed into rows in left-to-right top-to-bottom order taking the icons in the initial ordering determined by all of the sort attributes. In more detail, the processor 10 then adds the ordered icons to the rows in the display space from left to right. When the maximum number of icons in the current row is reached, a new row is created below the current row. As each icon is added, the section breaking attributes associated with the icon are checked by the processor 10. If any section breaking attribute of the current icon differs in value from the same section breaking attribute of the previous icon, a new section header is added for the new section breaking attribute value. A new row is created below the new section header and the icon is added to the left edge of the new row.

The abacus layout circuit 50 is activated to position the icons within each row based on the abacus group number of each icon and based on the sorting attributes that are not section breaking. Icons with the same abacus group number are positioned next to each other within the row. These groups of icons are, in turn, ordered within the row based on the predetermined left-to-right ordering of the abacus group numbers. Optionally, gaps are added between the abacus icon groups to make it easier to distinguish them visually. Within each icon abacus group, icons are ordered based on the sort attributes that are not section breaking.

Icon positioning by group number ensures that icons in the same group in a row are displayed adjacent to each other. The icons within the same group but on different rows are visually integrated into a single group by their relative position in their respective rows, by their relationship to separating gaps on each row, and optionally by common background colors, patterns and the like, enclosing polygons and/or boundaries created from smooth or jagged edge lines, differing display characteristics and the like.

After the groups of icons have been laid out as a visualization in the display space, the system for displaying meta-data 100 forwards the visualization to the communications-enabled personal computer 3009 over the communications links 99.

Figure 4:
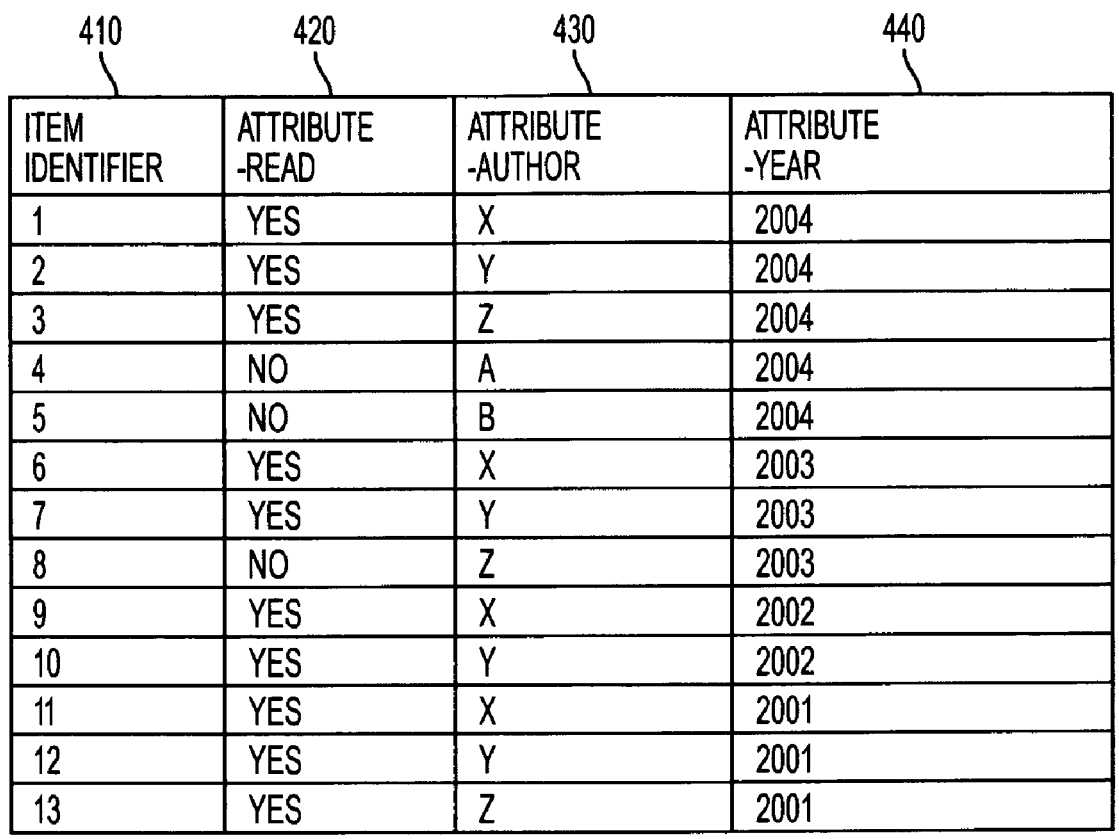
FIG. 4 is an exemplary data structure for storing icon attribute information according to this invention.

FIG. 4 is an exemplary data structure for storing icon attribute information according to this invention. The first row entry contains the value "1" in the icon identifier field 410. The icon identifier field 410 identifies the icon within the system for displaying meta-data.

The first row entry contains the value "YES" in the read attribute field 420. The "YES" value indicates that the document associated with the icon has been read by the user. This information is communicated by positioning the icon within the read group of icons.

The author attribute field contains the value "X" indicating the author of the document represented by the icon. In various exemplary embodiments according to this invention, the author and/or any other attribute values are used to sort icons into a complete ordering, assign the icons to rows and later to sort the icons within their respective groups.

The year attribute field contains the value "2004" indicating that icon number 1 will be displayed within one of the rows associated with year 2004. It will be apparent that in still other exemplary embodiments according to this invention, the attribute values may be switched without departing from the spirit or scope of this invention. Thus, sorting within groups may be based on year and/or various other attributes associated with the icons. The groups may be based on any attribute value and may be displayed vertically or horizontally.

Figure 5:
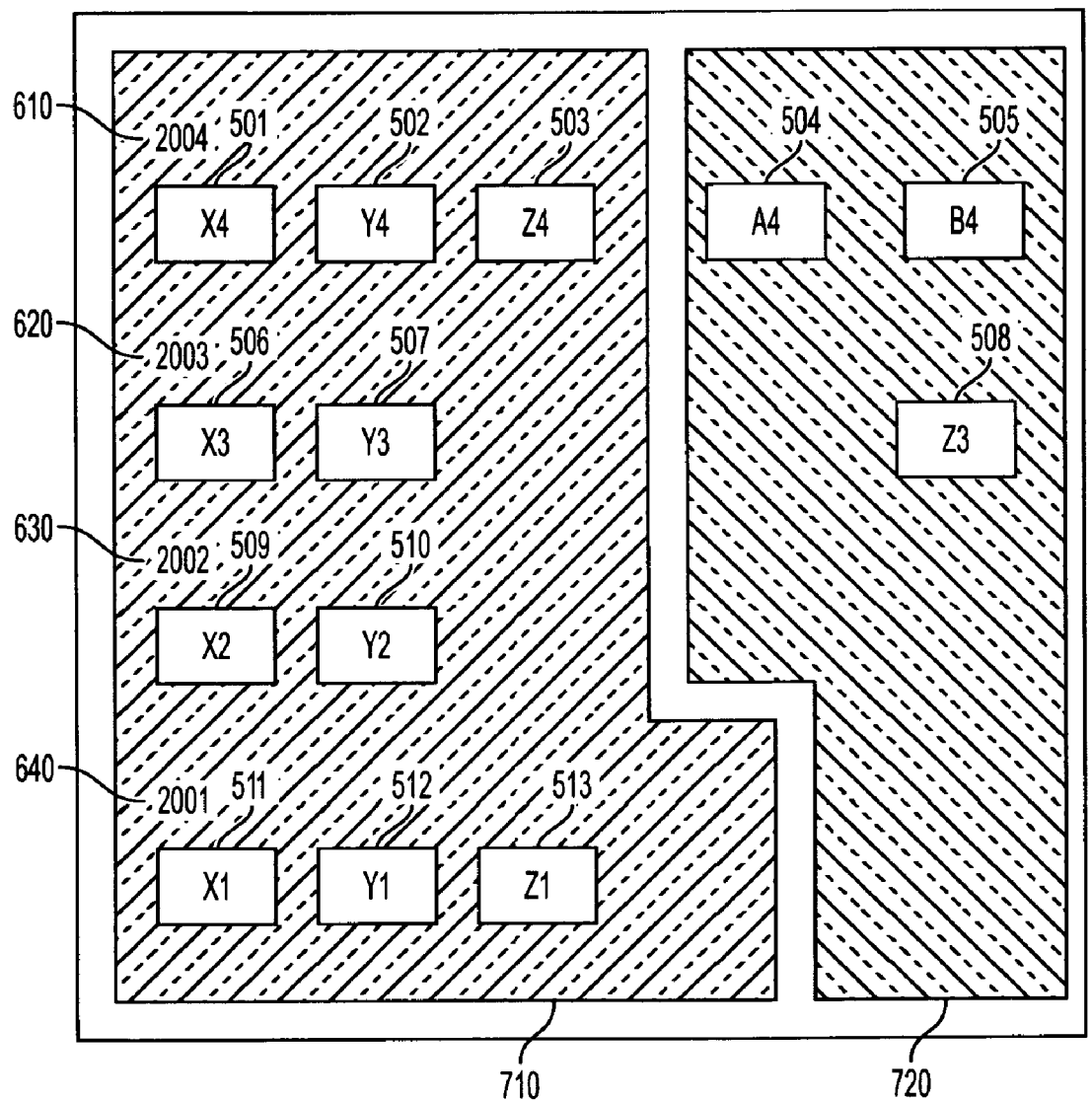
FIG. 5 shows an exemplary display space according to one aspect of this invention.

FIG. 5 shows an exemplary display space according to one aspect of this invention. The icons 501-513 are assigned to four different rows. The first row is associated with a 2004 year attribute value 610. Thus, icons representing documents published in 2004 are positioned within the rows associated with the 2004 year attribute value 610. The maximum number of icons in the columns is determined to be five. Each icon is assigned to a group based on the first attribute.

Thus, icons X4, Y4, Z4 501-503 are each assigned to the first group 710 based on the read attribute. The read attribute indicates whether the document represented by the icon has been read. Thus, since the documents represented by the icons X4, Y4, Z4 501-503 have been read by the user, the read attribute value for these documents and associated icons is set to the value "read".

The icons A4, B4 504-505 are assigned to the second group of icons 720 because the read attribute for these document and associated icons is set to the value "unread". The first group 710 and the second group 720 are separated by an inter-group indicator such as an inter-group gap. The inter-group indicator signals the logical separation between the adjacent groups. Moreover, the icons in the first and second groups are each laid out over optional background colors, patterns and/or other indicators that signal membership in a particular group. The display of information clearly indicates the presence of two groups in a compact format.

Within each group, the icons are ordered left to right based on an author name attribute. Here the author name of X4 precedes the author name of Y4 which in turn precedes the author name of Z4. Similarly, the author name of A4 precedes the author name of B4. In one exemplary embodiment, author names are not ordered between groups, so A4 may precede X4 or X4 may precede A4.

The second row contains the icons X3, Y3 506-507 in the first group 710 and the icon Z3 506 in the second group. Each of the icons in the second row is further associated with the 2003 year attribute value 620. This positional display provides a compact indication that the icons X3, Y3 506-507 are associated with the first group; icon Z3 is associated with the second group; and that the each of the icons is associated with the a 2003 year attribute value 630.

The third row contains the icons X2, Y2 509-510. These icons are both associated with the first group 710 indicating that the documents represented by the icons have been read. There is no second group icon in the row. The icons in the third row are associated with a 2002 year attribute value 630.

The fourth row indicates that icons X1, Y1, Z1 511-513 are associated with the first group 710. Thus, icons in the first group 710 have all been read. There are no second group icons 720 in the fourth row. The icons X1, Y1, Z1 511-513 are all associated with 2001 640 for the year attribute value 640.

Figure 6:
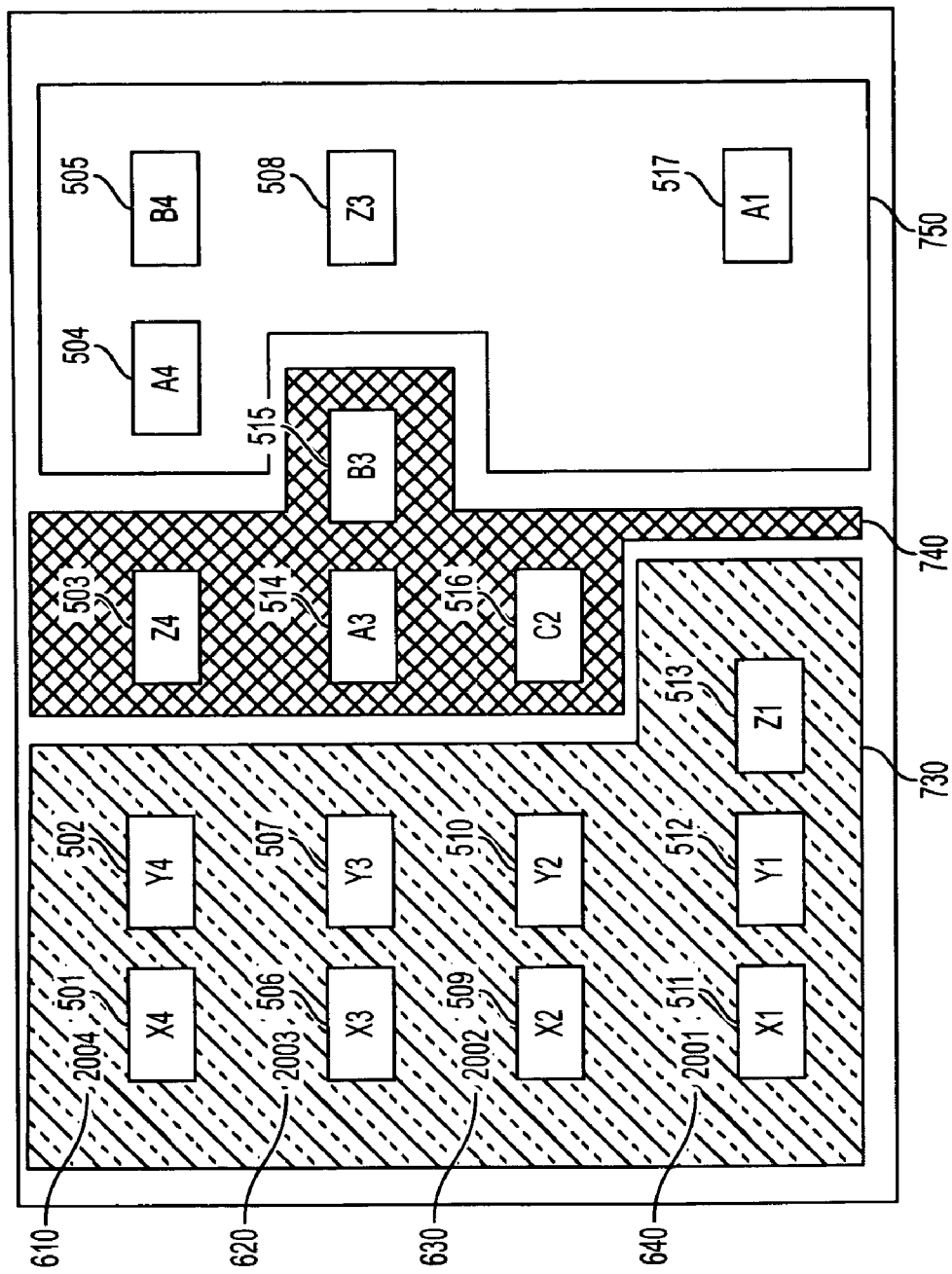
FIG. 6 show an exemplary visualization of a document collection according to this invention.

FIG. 6 shows an exemplary visualization of a document collection according to this invention. The icons are assigned to a first group 730, a second group 740 and a third group 750 based on a rating attribute associated with the document represented by the icon. The first group 730 comprised of X4 and Y4 501-502 reflects documents rated "GOOD" by the user. The second group 740 comprising Z4 503 reflects documents rated "BAD" by the user. The third group 750 comprised of A4 and B4 504-505 reflects documents as yet "UN-RATED" by the user.

For example, in one exemplary embodiment, the documents are movies in the user's movie library. The first group 730 reflects movies rated "GOOD" by the user. The second group 740 reflects movies rated "BAD" by the user and the third group 750 reflects movies as yet "UN-RATED" by the user.

The exemplary visualization of the user's movie library provides a compact representation of the movie collection within the context of the user's current rating system. The visualization of a film critic, a trusted reviewer or the like is then easily shared with other users, even those with relatively small quantities of available display space. In various other exemplary embodiments according to this invention, the visualization is categorized by genre, actors, producers and/or any known or later developed attribute associated with the documents.

In one exemplary embodiment, the first, second and third groups 730-750 are each associated with a different background display characteristic. The differences in backgrounds between successive or adjacent groups form a compact inter-group indicator. In various other exemplary embodiments, a portion of display space, such as a portion of a row that is not occupied by icons, is used to indicate the conceptual or logical separation between groups. Moreover, it will be apparent that the portions of space, differing display characteristics and/or any other known or later developed inter-group indicators may be used alone or in combination without departing from the scope of this invention.

The second row is associated with the 2003 year attribute value 620 contains icons X3, Y3 506-507 associated with the first or "GOOD" group 730, the icons A3, B3 514-515 in the second or "BAD" group 740 and Z3 508 in the third or "UN-RATED" group 750. The inter-group indicator is comprised of differing background patterns or colors between the adjacent groups.

Similarly, the third row associated with the 2002 year attribute value 630 contains icons X2, Y2 509-510 in the first or "GOOD" group and the icon C2 516 in the second or "BAD" group. The fourth row associated with the 2001 year attribute value 640 contains icons X1, Y1, Z1 511-513 in the first "GOOD" group 730. The fourth row contains no icons in the second "BAD" group 740 and contains the icons A1, 517 in the "UN-RATED" group.

Figure 7:
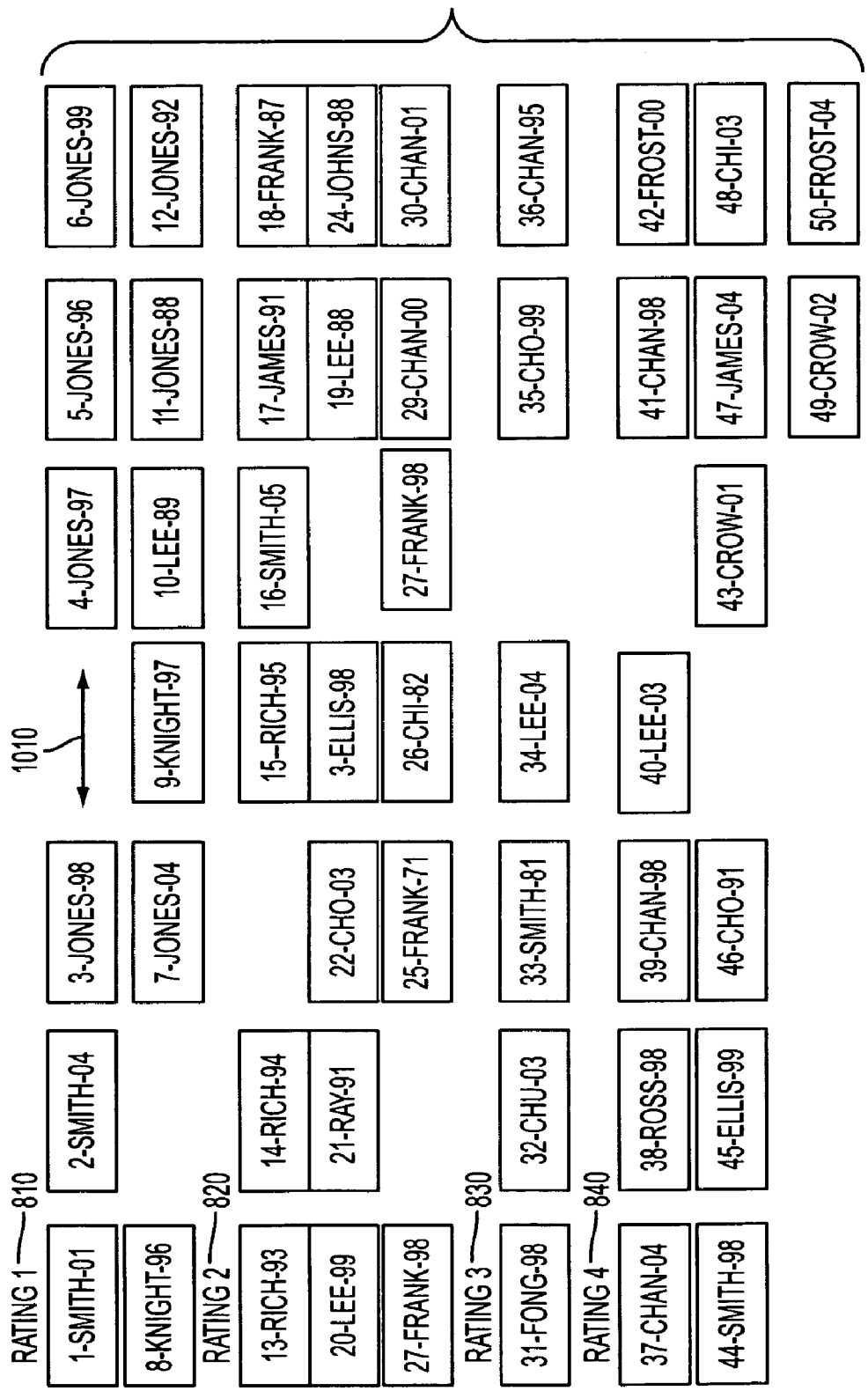
FIG. 7 shows an exemplary visualization of movies according to one aspect of this invention.

FIG. 7 shows an exemplary visualization of movies according to one aspect of this invention. The rating scores 810-840 indicate the rating of each movie in the collection. The display is divided into a first group on the left of the display and a second group on the right side of the display. The two groups are separated by an exemplary inter-group separator 1010. The inter-group separator 1010 is a space equivalent to the width of one icon. The inter-group indicator signals a logical or organization transition between the adjacent icons in the row. The inter-group indicator may be a change in a display characteristic, a column space of some size, a background color, pattern or the like and/or any other known or later developed display characteristic useful in indicating a difference between two groups of icons.

Figure 8:
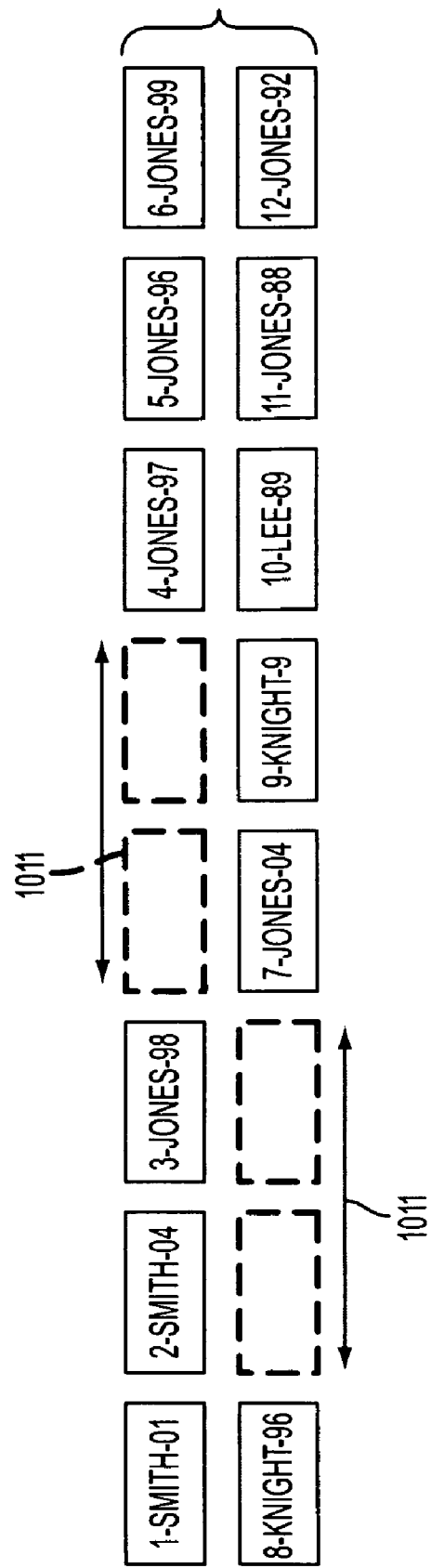
FIG. 8 shows rows of an exemplary visualization employing a two column type of inter-group indicator.

FIG. 8 shows rows of an exemplary visualization employing a two column type of inter-group indicator. The icons 1-3 and 8 form a first group of icons based on a first value for the binary attribute. The icons 4-7 and 9-12 form a second group of icons based on the second value for the binary attribute. The inter-group indicator 1011 separates the icons in the two groups using two columns of display space. The values of the binary attributes for each icon are easily determined from the resultant visualization.

Figure 9:
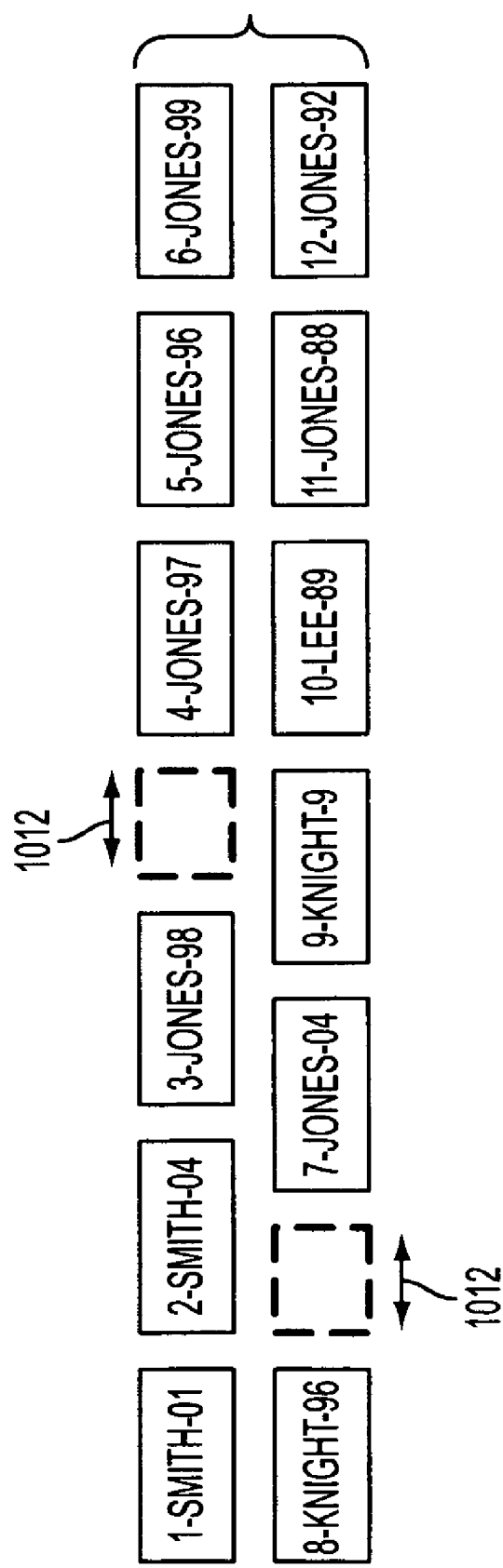
FIG. 9 shows rows of an exemplary visualization employing a half column type of inter-group indicator.

FIG. 9 shows rows of an exemplary visualization employing a half column type of inter-group indicator. As in FIG. 8, the icons 1-3 and 8 form a first group of icons based on a first value for the binary attribute. The icons 4-7 and 9-12 form a second group of icons based on the second value for the binary attribute. The inter-group indicator 1012 separates the icons in the two groups using a half column of display space. The values of the binary attributes for each icon are easily determined from the resultant visualization.

Figure 10:
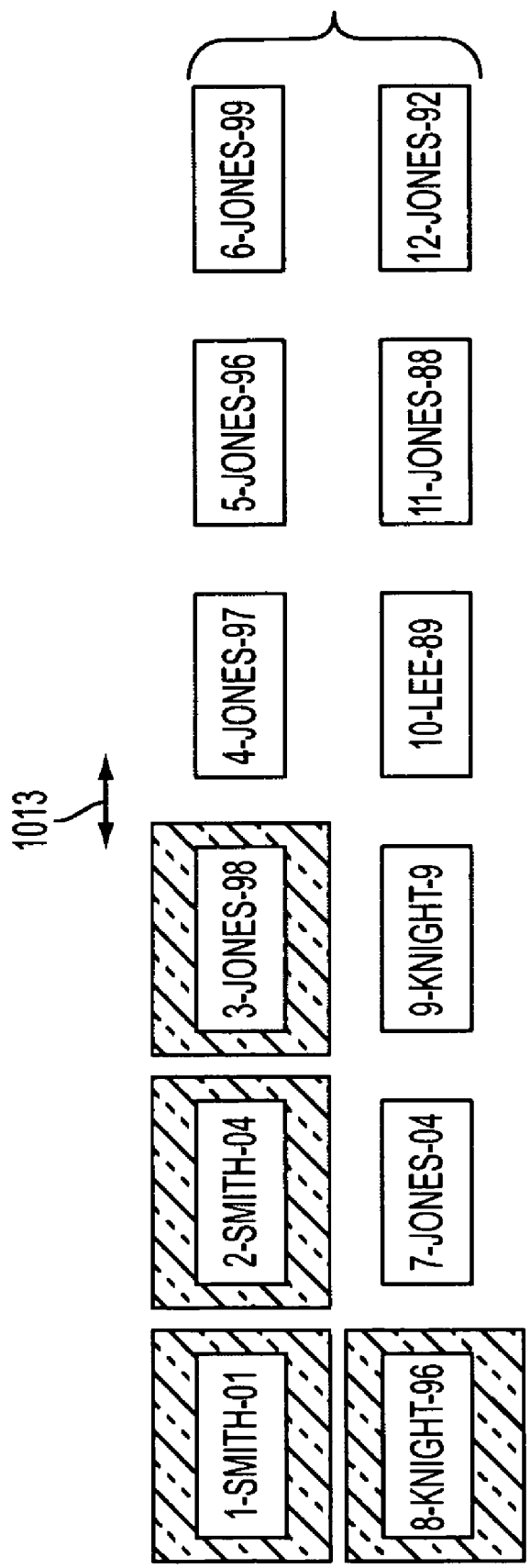
FIG. 10 shows rows of an exemplary visualization employing a change of display characteristic type of inter-group indicator.

FIG. 10 shows rows of an exemplary visualization employing a change of display characteristic type of inter-group indicator. The icons 1-3 and 8 form a first group of icons based on a first value for a binary attribute. The icons 4-7 and 9-12 form a second group of icons based on a second value for the binary attribute. The inter-group indicator 1013 is a transition between the display characteristics of the icons at the border of the respective groups. Thus, the display characteristics for icon 3 differ from the display characteristics for icon 4. Similarly, display characteristics for icon 8 differ from the display characteristics for icon 7. The differences in display characteristics signal that the two icons are not related by the selected attribute.

Figure 11:
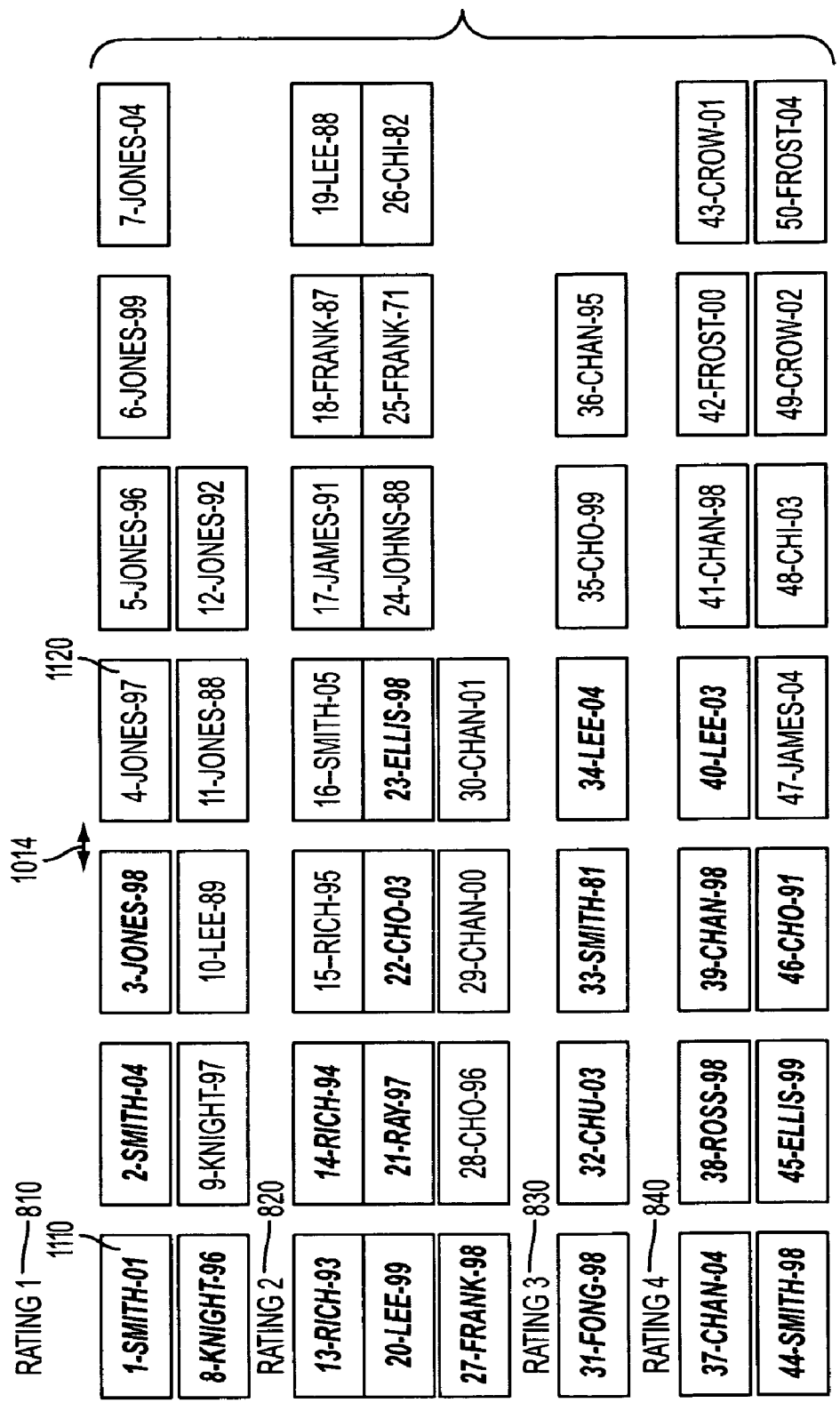
FIG. 11 shows a first exemplary sorted visualization according to this invention.

FIG. 11 shows a first exemplary sorted visualization according to this invention. The icons are categorized into 4 blocks of rows associated with the rating attribute values 810-840. The icons are divided into a first and second group based on the value of the attribute. An inter-group indicator 1014 is formed by creating a difference in display characteristics between the adjacent groups of icons. The icons in the first group are associated with a first display characteristic 1110 and icons in the second group are associated with a second different display characteristic 1120 not the same as the first. The degree of difference between adjacent display characteristics must be sufficient to signal the user of the conceptual shift between the groups.

In some exemplary embodiments according to this invention, the display characteristics are dynamically selected based on the current usage context, explicitly set by the user and/or set programmatically. For example, although an "italics to normal font" inter-group indicator can be discerned at larger font sizes, this inter-group indicator is less apparent at smaller font sizes. Thus, in some exemplary embodiments according to this invention the inter-group display characteristics are dynamically selected based on the current display context. In other embodiments, the user manually selects the different display characteristics useful in signaling the inter-group gap.

Figure 12:
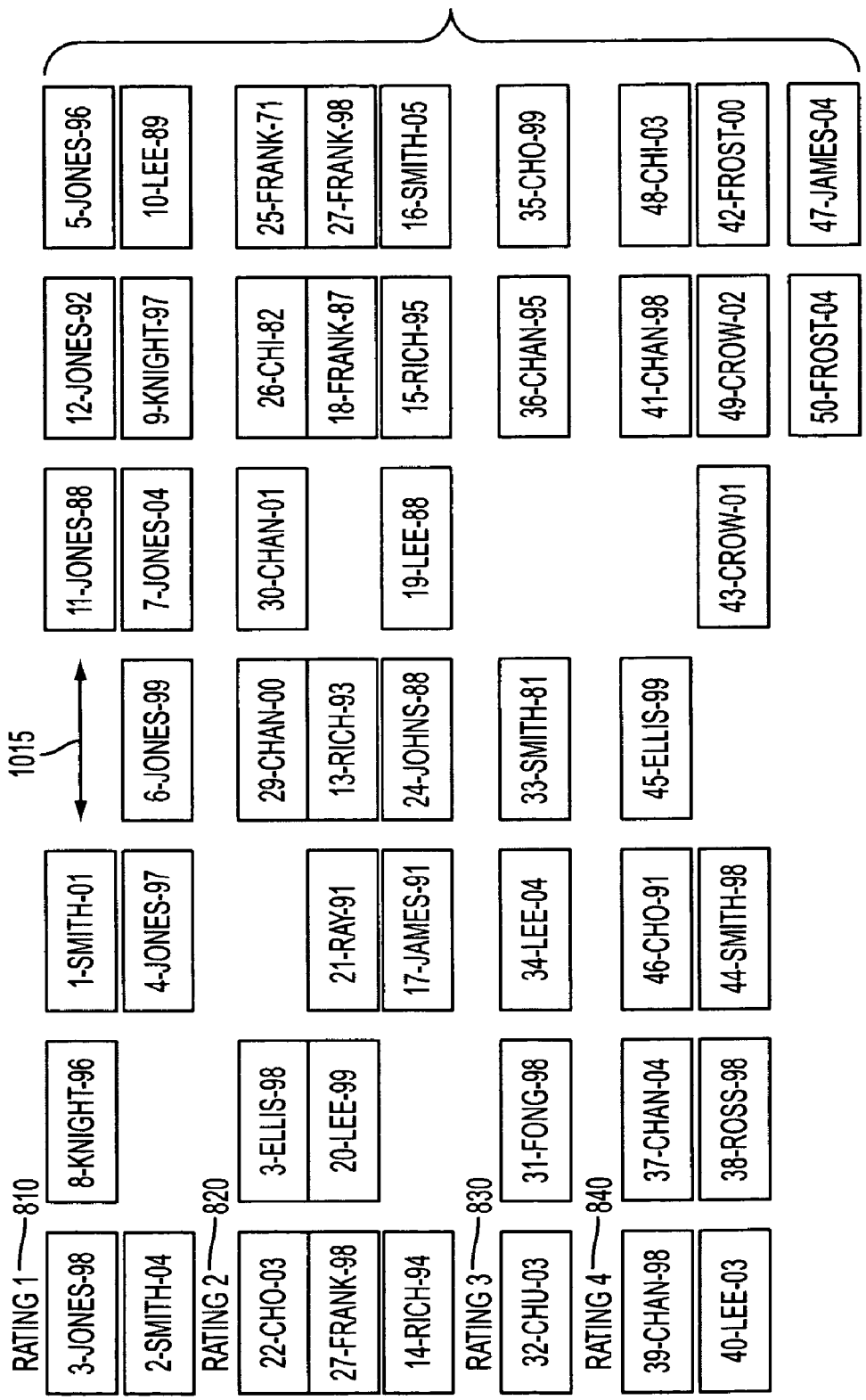
FIG. 12 shows a second exemplary sorted visualization according to this invention.

FIG. 12 shows a second exemplary sorted visualization according to this invention. The icons are categorized into 4 blocks of rows associated with a rating attribute having values 1-4 810-840. The icons are separated into two groups by the inter-group indicator 1015. The exemplary inter-group indicator 1015 is a horizontal blank space equal in width to a single icon. Thus, a gap of at least the width of one icon is inserted between the third icon and the fourth icon, signaling a logical shift to the user. The icons in the first and second group are optionally sorted by the author's name thereby providing additional information and additional spatial cues useful to the user.

In the various embodiments of the system for displaying meta-data 100, each of the circuits 10-70 outlined above can be implemented as portions of a suitably programmed general-purpose computer. Alternatively, 10-70 of the system for displaying meta-data 100 outlined above can be implemented as physically distinct hardware circuits within an ASIC, or using a FPGA, a PDL, a PLA or a PAL, or using discrete logic elements or discrete circuit elements. The particular form each of the circuits 10-70 of the system for displaying meta-data 100 outlined above will take is a design choice and will be obvious and predictable to those skilled in the art.

Moreover, the system for displaying meta-data 100 and/or each of the various circuits discussed above can each be implemented as software routines, managers or objects executing on a programmed general purpose computer, a special purpose computer, a microprocessor or the like. In this case, the system for displaying meta-data 100 and/or each of the various circuits discussed above can each be implemented as one or more routines embedded in the communications network, as a resource residing on a server, or the like. The system for displaying meta-data 100 and the various circuits discussed above can also be implemented by physically incorporating the system for displaying meta-data 100 into software and/or hardware system, such as the hardware and software systems of a web server or a client device.

It will be apparent that in various other exemplary embodiments according to this invention the term icons may refer to any displayable shape that represents information. It should also be apparent that the information represented by the icons may include documents, contact information, financial information, bibliographic information, a to-do list, the profile of a person or company, a database record, geographic information, or any other kinds of information.

As shown in FIG. 3, memory 15 can be implemented using any appropriate combination of alterable, volatile or non-volatile memory or non-alterable, or fixed memory. The alterable memory, whether volatile or non-volatile, can be implemented using any one or more of static or dynamic RAM, a floppy disk and disk drive, a write-able or rewrite-able optical disk and disk drive, a hard drive, flash memory or the like. Similarly, the non-alterable or fixed memory can be implemented using any one or more of ROM, PROM, EPROM, EEPROM, an optical ROM disk, such as a CD-ROM or DVD-ROM disk, and disk drive or the like.

The communication links 99 shown in FIGS. 1 & 3, can each be any known or later developed device or system for connecting a communication device to the system for displaying meta-data 100, including a direct cable connection, a connection over a wide area network or a local area network, a connection over an intranet, a connection over the Internet, or a connection over any other distributed processing network or system. In general, the communication links 99 can be any known or later developed connection system or structure usable to connect devices and facilitate communication.

Further, it should be appreciated that the communication links 99 can be wired or wireless links to a network. The network can be a local area network, a wide area network, an intranet, the Internet, or any other distributed processing and storage network.

While this invention has been described in conjunction with the exemplary embodiments outlined above, it is evident that many alternatives, modifications and variations will be apparent to those skilled in the art. Accordingly, the exemplary embodiments of the invention, as set forth above, are intended to be illustrative, not limiting. Various changes may be made without departing from the spirit and scope of the invention.

What is claimed is:

1. A method for laying out graphical icons, wherein all the steps are performed on a suitably programmed computer, comprising:

maintaining a collection of documents;

determining a plurality of attributes associated with the documents;

receiving a request for visualization of the documents based on a first attribute;

determining icons for the documents matching the first attribute;

assigning icons to rows based on a second attribute of the documents, wherein each row contains N or fewer icons;

labeling each row with a row indicator indicating a common value for the second attribute for the icons within each row;

assigning icons to groups based on the first attribute of the documents in which a plurality of groups are determined;

placing the icons in each group in successive portions of each row;

separating each group with an inter-group indicator comprising a visual signal indication of a logical difference between each group;

ordering the icons in the same row and group by a third attribute of the documents;

organizing the icons into variably dimensioned columns based on the number of icons in each group in each row and the size of the inter-group indicator;

laying out the icons associated with each row in a display space wide enough to contain N+k icons for some non-negative number k, wherein k is at least one of: a positive integer, 0, a non-negative integer plus a fraction;

placing a first group of icons on a first end of each row and a second group of icons on the opposite end of each row;

placing icons on backgrounds indicating group membership, in which the background comprises at least one of: a display characteristic, a color, and a pattern; and placing the icons in the display space, wherein all steps are executed by a processor.

2. The method of claim 1, in which the region of display space containing each group in each row is separated by a line from the region of the display containing the immediately preceding group in that row, if any, and is separated by a line from the region of the display containing the immediately following group in that row, if any.

3. The method of claim 1, in which the icons are assigned to groups before being assigned to rows.

4. The method of a claim 1, in which the icons are assigned to rows based on the value of a plurality of attributes.

5. The method of claim 1, in which the document comprises at least one of: audio, graphical and textual information.

6. The method of claim 1, in which the first attribute is associated with a binary value indicating whether a document has been read.

7. The method of claim 1, in which the first attribute has any number of values.

8. The method of claim 1, in which the first attribute represents at least one of a rating, a ranking, and a score.

9. The method of claim 1, in which the second attribute is a composite attribute, made of an ordered list of more fundamental attributes.

10. The method of claim 1, in which an icon in a first abacus group of a first row is placed at a first horizontal position and a second icon in a distinct second abacus group on a second row is placed at a substantially overlapping horizontal position.

11. A system for laying out graphical icons comprising:
a display space;
a data repository storing a collection of documents;
a memory storing processing instructions; and
a processor configured to execute the processing instructions, wherein the processing instructions comprise:
maintaining a collection of documents;
determining a plurality of attributes associated with the documents;
receiving a request for visualization of the documents based on a first attribute;
determining icons for the documents matching the first attribute;
assigning icons to rows based on a second attribute of the documents, wherein each row contains N or fewer icons;
labeling each row with a row indicator indicating a common value for the second attribute for the icons within each row;
assigning icons to groups based on the first attribute of the documents in which a plurality of groups are determined;
placing the icons in each group in successive portions of each row;
separating each group with an inter-group indicator comprising a visual signal indication of a logical difference between each group;
ordering the icons in the same row and group by a third attribute of the documents;
organizing the icons into variably dimensioned columns based on the number of icons in each group in each row and the size of the inter-group indicator;
laying out the icons associated with each row in a display space wide enough to contain N+k icons for some non-negative number k, wherein k is at least one of: a positive integer, 0, a non-negative integer plus a fraction;
placing a first group of icons on a first end of each row and a second group of icons on the opposite end of each row;
placing icons on backgrounds indicating group membership, in which the background comprises at least one of: a display characteristic, a color, and a pattern; and
placing the icons in the display space.

12. A computer readable storage medium comprising computer readable program code embodied on the computer readable storage medium, the computer readable program code useable to program a computer to displaying meta-data comprising the steps of:
maintaining a collection of documents;
determining a plurality of attributes associated with the documents;
receiving a request for visualization of the documents based on a first attribute;
determining icons for the documents matching the first attribute;
assigning icons to rows based on a second attribute of the documents, wherein each row contains N or fewer icons;
labeling each row with a row indicator indicating a common value for the second attribute for the icons within each row;
assigning icons to groups based on the first attribute of the documents in which a plurality of groups are determined;
placing the icons in each group in successive portions of each row;
separating each group with an inter-group indicator comprising a visual signal indication of a logical difference between each group;
ordering the icons in the same row and group by a third attribute of the documents;
organizing the icons into variably dimensioned columns based on the number of icons in each group in each row and the size of the inter-group indicator;
laying out the icons associated with each row in a display space wide enough to contain N+k icons for some non-negative number k, wherein k is at least one of: a positive integer, 0, a non-negative integer plus a fraction;
placing a first group of icons on a first end of each row and a second group of icons on the opposite end of each row;
placing icons on backgrounds indicating group membership, in which the background comprises at least one of: a display characteristic, a color, and a pattern; and
placing the icons in the display space.

13. A method of laying out graphical icons, wherein all the steps are performed on a suitably programmed computer, comprising:
maintaining a collection of documents;
determining a plurality of attributes associated with the documents;

receiving a request for visualization of the documents based on a first attribute;

determining icons for the documents matching the first attribute;

determining at least one icon group based on the first attribute in which a plurality of groups are determined;

separating each group by an inter-group indicator comprising a visual signal indication of a logical difference between each group;

determining a primary ordering of the icons within each group, in a first direction, based on a second attribute, wherein the primary ordering comprises rows, in which the rows are partitioned into sections of consecutive rows and in which a section header indicating a common value for the second attribute for the icons within each row is added before each section;

determining a secondary ordering of the icons within each group, in a second direction, based on a third attribute;

organizing the icons into variably dimensioned columns based on the number of icons in each group in each row and the size of the inter-group indicator;

laying out the icons associated with each row in a display space wide enough to contain N+k icons for some non-negative number k, wherein k is at least one of: a positive integer, 0, a non-negative integer plus a fraction;

placing a first group of icons on a first end of each row and a second group of icons on the opposite end of each row;

placing icons on backgrounds indicating group membership, in which the background comprises at least one of: a display characteristic, a color, and a pattern; and placing the icons in the display space, wherein all steps are executed by a processor.

14. The method of claim 13, further comprising the steps of:

determining group cues based on the first attribute; and displaying the icons and the group cues.

15. The method of claim 13, in which the inter-group indicator is at least one of: a difference in display characteristics; and a display gap between groups.

16. The method of claim 13, in which the inter-group indicator is a display gap between groups.

17. A system for laying out graphical icons comprising:

a display space;

a data repository storing a collection of documents;

a memory storing processing instructions; and a processor configured to execute the processing instructions, wherein the processing instructions comprise:

determining a plurality of attributes associated with the documents;

receiving a request for visualization of the documents based on a first attribute;

determining icons for the documents matching the first attribute;

determining at least one icon group based on the first attribute in which a plurality of groups are determined;

separating each group by an inter-group indicator comprising a visual signal indication of a logical difference between each group;

determining a primary ordering of the icons within each group, in a first direction, based on a second attribute, wherein the primary ordering comprises rows, in which the rows are partitioned into sections of consecutive rows and in which a section header indicating a common value for the second attribute for the icons within each row is added before each section;

determining a secondary ordering of the icons within each group, in a second direction, based on a third attribute;

organizing the icons into variably dimensioned columns based on the number of icons in each group in each row and the size of the inter-group indicator;

laying out the icons associated with each row in a display space wide enough to contain N+k icons for some non-negative number k, wherein k is at least one of: a positive integer, 0, a non-negative integer plus a fraction;

placing a first group of icons on a first end of each row and a second group of icons on the opposite end of each row;

placing icons on backgrounds indicating group membership, in which the background comprises at least one of: a display characteristic, a color, and a pattern; and placing the icons in the display space.

* * * * *